United States Patent
Gopal

(10) Patent No.: US 6,991,836 B1
(45) Date of Patent: *Jan. 31, 2006

(54) FOOD CASING RELEASE COATING COMPRISING POLYGLYCERYL ESTERS

(75) Inventor: Harsh Gopal, Danville, IL (US)

(73) Assignee: Teepak Properties, LLC, Lisle, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/228,103

(22) Filed: Jan. 11, 1999

(51) Int. Cl.
 *A22C 13/02* (2006.01)

(52) U.S. Cl. ............... 428/34.8; 428/34.3; 138/118.1; 426/105; 426/135; 426/138; 426/330.6; 426/415; 554/227

(58) Field of Classification Search ............... 428/34.8, 428/36.9, 36.91, 446, 533, 534, 34.3; 426/105, 426/138, 277, 278, 135, 329, 330.6, 413, 426/415; 138/118.1; 554/227
See application file for complete search history.

(56) References Cited

U.S. PATENT DOCUMENTS

| | | | | |
|---|---|---|---|---|
| 3,451,827 A | * | 6/1969 | Bridgeford | 99/176 |
| 3,818,947 A | | 6/1974 | Rose | 138/118.1 |
| 3,834,920 A | | 9/1974 | Rose | 106/267 |
| 3,898,348 A | | 8/1975 | Chiu, et al. | 426/413 |
| 3,966,632 A | * | 6/1976 | Colliopoulos et al. | 252/309 |
| 3,981,046 A | | 9/1976 | Chiu | 17/49 |
| 4,062,980 A | | 12/1977 | Wilson et al. | 426/278 |
| 4,062,981 A | | 12/1977 | Bridgeford | 426/278 |
| 4,137,947 A | * | 2/1979 | Bridgeford | 138/118.1 |
| 4,161,968 A | | 7/1979 | Rasmussen et al. | 138/118.1 |
| 4,207,353 A | | 6/1980 | Rasmussen et al. | 426/513 |
| 4,528,225 A | * | 7/1985 | Hutschenreuter et al. | 138/118.1 |
| 4,563,376 A | * | 1/1986 | Hammer et al. | 138/118.1 |
| 4,596,727 A | | 6/1986 | Higgins et al. | 428/36 |
| 5,370,914 A | * | 12/1994 | Hammer et al. | 428/34.8 |
| 5,431,719 A | * | 7/1995 | Clapp et al. | 106/2 |

FOREIGN PATENT DOCUMENTS

| | | | |
|---|---|---|---|
| DE | 23 00 338 | | 8/1973 |
| EP | 0 109 611 | | 5/1984 |
| EP | 0 180 207 | | 5/1986 |
| EP | 0 700 637 | | 3/1996 |
| FR | 2 342 664 | | 9/1977 |
| GB | 1042182 | | 9/1966 |
| GB | 1 470 726 | * | 4/1977 |
| GB | 2 010 124 | | 6/1979 |
| GB | 2 137 901 | | 10/1984 |

OTHER PUBLICATIONS

Howard et al., Dictionary of Chemical Names and Synonyms, 1992, pp I-302, I-958.*
U.S. Appl. No. 09/228,641, filed Jan. 12, 1999, pending.
U.S. Appl. No. 09/514,356, filed Feb. 28, 2000, pending.

* cited by examiner

*Primary Examiner*—Harold Pyon
*Assistant Examiner*—Sow-Fun Hon
(74) *Attorney, Agent, or Firm*—Fish & Richardson P.C.

(57) ABSTRACT

A food casing having an internal surface coating of a dried aqueous emulsion including at least one polyglyceryl ester. The polyglyceryl ester in the coating covers the internal surface of the food casing in an amount of from about 200 to about 1200 mg per square meter. The polyglyceryl ester may be almost any polyglyceryl ester having from about 1 to about 4 ester groups formed with carboxylic acids having from about 6 to about 18 carbon atoms. The polyglyceryl ester may for example be selected from triglyceryltetraoleate and triglycerylmonooleate. The food casing has superior meat release characteristics in certain applications.

27 Claims, No Drawings

FOOD CASING RELEASE COATING COMPRISING POLYGLYCERYL ESTERS

BACKGROUND OF THE INVENTION

This invention relates to food casings and more particularly relates to food casings that are coated with a composition to assist in release of the food casing from contained food product. Many coating compositions are known for affecting the release characteristics of food casings from contained food product such as sausage meat. For example, cationic resins and proteins have been used to increase adhesion during drying of sausage product so that the food casing shrinks with the sausage product yet to provide insufficient adherence to prevent easy removal when the contained sausage product is to be used. Other compositions such as carboxymethyl cellulose have been used to provide easy release for "skinless" sausage product. In such product, meat contained in the food casing is cooked and the casing is removed prior to sale. In the case of fiber reinforced food casing (fibrous casing), an aqueous emulsion of alkylketene dimer (AKD) has been used to provide release characteristics. At least some elevation of temperature and pH have been required to cure a coating containing it. AKD has thus been applied in a bicarbonate/carbonate buffer at ambient temperature and cure is effected during heat drying of the casing. Machine speeds to make food casing have continuously increased to improve efficiency of manufacture, as a result time available for cure of AKD has been reduced. Unfortunately, alkylketene dimer is not stable at temperatures and pH sufficiently elevated to obtain rapid cure and uncured and ineffective release coatings containing AKD have resulted.

BRIEF DESCRIPTION OF THE INVENTION

In accordance with the invention, a food casing is provided which comprises an internal surface coating of a dried aqueous emulsion comprising at least one polyglyceryl ester. The polyglyceryl ester in the coating covers the internal surface of the food casing in an amount of from about 200 to about 1200 mg per square meter. The polyglyceryl ester may be almost any polyglyceryl ester having from about 1 to about 4 ester groups formed with carboxylic acids having from about 6 to about 18 carbon atoms. The polyglyceryl ester may for example be selected from triglyceryltetraoleate and triglycerylmonooleate.

Food casings, especially fibrous food casings, have a smoother surface coating and are more flexible upon drying. Unlike AKD, the coating requires no curing.

DETAILED DESCRIPTION OF THE INVENTION

Food casings suitable for receipt of the release coating include both fibrous and unreinforced casings of both seamed and unseamed varieties. The food casing material may be any film forming material such as collagen or thermoplastic but is generally of a formed polysaccharide such as cellulose. The cellulose may be of a derivatized or non-derivatized form.

The aqueous emulsion may be applied to the internal surface of the food casing by any suitable means, e.g. bubble coating or spraying. The aqueous emulsion usually contains from about 1 to about 5 weight percent polyglyceryl ester. The aqueous emulsion may additionally contain other components such as up to about 2 weight percent of a water soluble cellulose derivative, e.g. methylcellulose, hydroxymethycellulose, hydroxypropylcellulose, and hydroxypropylmethylcellulose.

The aqueous emulsion may additionally contain up to about 5 weight percent of a water insoluble low viscosity oil. Such oil may for example be selected from soybean oil, cottonseed oil, mineral oil, animal derived oil, and silicon oil.

The aqueous emulsion may further include from about 0.1 to about 2 weight percent of an emulsifier, such as alkyl sulfonates, polysorbates, alkylene glycol esters, and ethoxylated monoglycerides or ethoxylated diglycerides.

The emulsion may also contain from about 10 to about 20 weight percent of a polyhydric alcohol, such as glycerin and propylene glycol.

The dried coating includes polyglyceryl ester in an amount of from about 200 to about 1200 mg per square meter and preferably from about 400 to about 1000 mg per square meter of internal food casing surface.

An example of a preferred composition for use as a coating in accordance with the invention would be: from about 1 to about 5 weight percent triglyceroltetraoleate, about 0 to about 2 weight percent triglycerolmonooleate, about 0 to about 2 weight percent of hydroxypropylmethylcellulose, about 1 to about 5 weight percent of a soybean-cotton seed oil blend, about 0.2 to about 1 weight percent of ethoxylated sorbitantristearate and from about 10 to about 20 weight percent glycerin and the balance being water.

The following examples serve to illustrate and not limit the present invention. Unless otherwise indicated, all parts and percentages are by weight.

EXAMPLE 1

A clear food casing is internally treated with an alkali liquid smoke to an add on of about 50 percent and treated with about 50 mg per square meter of ketene dimer release coating (higher add on tends to increase meat adhesion). This treated food casing was used as a first control, designated below as control #1.

A second control comprising the same casing as the first control was made by further adding triglycerol tetraoleate to the release coating of control #1. The second control is designated below as control #2.

A food casing, having a release coating in accordance with the present invention, was made by coating a clear casing, as in control #1 without ketene dimer, with an aqueous suspension containing about 2 percent triglceroltetraoleate, about 0.5 percent triglycerolmonooleate, about 0.5 percent hydroxypropylmethycellulose, about 2.5 percent of a mixture of soybean and cotton seed oil, about 0.5 percent of ethoxylated sorbitantristearate and about 15 percent glycerin to obtain an add on of about 800 mg/square meter of surface area of casing of polyglyceryl ester components in the suspension. This release casing according to the invention is designated below as "Invention".

A turkey meat product was stuffed into each of Control #1, Control #2 and Invention casings. The stuffed chub products were then placed on horizontal racks and thermally processed in a batch smokehouse. No breakage of any casings occurred.

The finished chub products were then slit longitudinally with a finger knife, grabbed at each end and turned over popping the cured meat chub out of the casing. The chubs were expected to fall out of the casing when turned over as in a high speed process. The operator was asked to rate each of the controls and the invention on a scale of 1 to 100, where 1=didn't peel to 100=perfect peel. The results are set forth in table 1.

TABLE 1

|  | Control #1 | Control #2 | Invention |
|---|---|---|---|
| Release | 10%–50% | 10%–40% | 95% |
| Meat Pull | None | None | None |
| Fuzz | Little | Very Little | None |
| Operator rating | 50 | 55 | 95 |

Table 1 confirms that the release coating of the invention is superior.

EXAMPLE 2

Example 1 was essentially repeated except that a pumpable ham and water product was used as the meat stuffed into the food casings that were then provided with clipped ends. The hams were then thermally processed and cooled. Color was good on all products. Release characteristics were tested by applying a consistent compressive force to both ends of a chub and observing the percentage of the casing's surface area to release from the meat. The results are shown in Table 2.

TABLE 2

|  | Control #1 | Control #2 | Invention |
|---|---|---|---|
| Release | 50% | 55% | 95% |

Again the table shows the superior characteristics of the release coating of the invention.

What is claimed is:

1. A food casing comprising an internal surface coating of an aqueous emulsion comprising polyglyceryl ester comprising at least two glyceryl moieties, which polyglyceryl ester consists essentially of a mixture of triglyceryltetraoleate and triglycerylmonooleate where the amount of triglyceryltetraoleate is greater than the amount of triglycerylmonooleate.

2. The food casing of claim 1 wherein the coating comprises from about 200 to about 1200 mg per square meter of internal surface of said polyglyceryl ester.

3. A food casing comprising an internal surface coating of a dried aqueous emulsion comprising from about 1 to about 5 wt. % polyglyceryl ester comprising at least two glyceryl moieties and from about 1 to about 4 ester groups, wherein the polyglyceryl ester comprises two different triglyceryl esters present in a ratio of about 4 to 1.

4. The food casing of claim 3 wherein the polyglyceryl ester is selected from the group consisting of triglyceryltetraoleate and triglycerylmonooleate where the amount of triglyceryloleate is greater than the amount of triglycerylmonooleate.

5. The food casing of claim 3 wherein the aqueous emulsion additionally contains up to about 2 wt. % of a water soluble cellulose derivative.

6. A coated food casing comprising an internal surface coating of an aqueous emulsion comprising at least one polyglyceryl ester and greater than 50 wt % of water, the polyglyceryl ester comprising at least two glyceryl moieties, and wherein the polyglyceryl ester is selected from the group consisting of triglyceryltetraoleate and triglycerylmonooleate.

7. The coated food casing of claim 6 wherein the aqueous emulsion further comprises from about 10 to about 20 wt % of a polyhydric alcohol.

8. The coated food casing of claim 7 wherein said polyhydric alcohol is selected from the group consisting of glycerin and propylene glycol.

9. The coated food casing of claim 6 wherein the polyglyceryl ester is present from about 1 to about 5 wt %.

10. The coated food casing of claim 6 wherein the aqueous emulsion further comprises up to about 2 wt % of a water soluble cellulose derivative.

11. The coated food casing of claim 10, wherein the water soluble cellulose derivative is selected from the group consisting of methylcellulose, hydroxymethylcellulose, hydroxypropylcellulose, and hydroxypropylmethylcellulose.

12. The coated food casing of claim 6, wherein the aqueous emulsion further comprises up to about 5 wt % of a water insoluble low viscosity oil.

13. The coated food casing of claim 12 wherein, said water insoluble low viscosity oil is selected from the group consisting of soybean oil, cottonseed oil, mineral oil, animal derived oil, and silicon oil.

14. The coated food casing of claim 6, wherein the aqueous emulsion further comprises from about 0.1 to about 2 wt % of an emulsifier.

15. The coated food casing of claim 6 wherein said aqueous emulsion coats from about 200 to 1200 mg per square meter.

16. The coated food casing of claim 6 wherein the polyglyceryl ester consists of triglyceryltetraoleate and triglycerylmonooleate.

17. A coated food casing comprising an internal surface coating of an aqueous emulsion comprising at least one polyglyceryl ester and greater than 65 wt % of water, the polyglyceryl ester comprising at least two glyceryl moieties, and wherein the polyglyceryl ester is selected from the group consisting of triglyceryltetraoleate and triglycerylmonooleate.

18. The coated food casing of claim 17 wherein the aqueous emulsion further comprises from about 0.1 to about 2 wt % of an emulsifier.

19. The coated food casing of claim 17 wherein the aqueous emulsion further comprises from about 10 to about 20 wt % of a polyhydric alcohol.

20. The coated food casing of claim 19 wherein the polyhydric alcohol is selected from the group consisting of glycerin and propylene glycol.

21. The coated food casing of claim 17 wherein the polyglyceryl ester is present from about 1 to about 5 wt %.

22. The coated food casing of claim 17 wherein the aqueous emulsion further comprises up to about 2 wt % of a water soluble cellulose derivative.

23. The coated food casing of claim 22, wherein the water soluble cellulose derivative is selected from the group consisting of methylcellulose, hydroxymethylcellulose, hydroxypropylcellulose, and hydroxypropylmethylcellulose.

24. The coated food casing of claim 17, wherein the aqueous emulsion further comprises up to about 5 wt. % of a water insoluble low viscosity oil.

25. The coated food casing of claim 24 wherein, said water insoluble low viscosity oil is selected from the group consisting of soybean oil, cottonseed oil, mineral oil, animal derived oil, and silicon oil.

26. The coated food casing of claim 17 wherein said aqueous emulsion coats from about 200 to 1200 mg per square meter.

27. The coated food casing of claim 17 wherein the polyglyceryl ester consists of triglyceryltetraoleate and triglycerylmonooleate.

* * * * *

UNITED STATES PATENT AND TRADEMARK OFFICE
CERTIFICATE OF CORRECTION

| | | |
|---|---|---|
| PATENT NO. | : 6,991,836 B1 | Page 1 of 1 |
| APPLICATION NO. | : 09/228103 | |
| DATED | : January 31, 2006 | |
| INVENTOR(S) | : Harsh Gopal | |

It is certified that error appears in the above-identified patent and that said Letters Patent is hereby corrected as shown below:

Title Page, (*) Notice: - delete "This patent is subject to a terminal disclaimer."

Title Page, item (56), References Cited, Other Publications line 3, -- delete "U.S. Appl. No. 09/228,641, filed Jan. 12, 1999, pending"

Title Page, item (56), References Cited, Other Publications line 4 -- delete "U.S. Appl. No. 09/514,356, filed Feb. 28, 2000, pending"

Column 1, Line 59 -- insert the following paragraph -- An aqueous emulsion is an oil-in-water emulsion, where water is the continuous phase in which oil or other hydrophobic molecules are dispersed. An aqueous emulsion, by definition, is one where the ratio of water to the sum total of the remaining components is greater than 1, *i.e.*, where the amount of water exceeds 50 wt % of the total. --

Column 2, Lines 47-48 -- replace "triglceroltetraoleate" with -- triglyceryltetraoleate --

Column 3, Line 53 -- replace "triglyceryloleate" with -- triglyceryltetraoleate --

Signed and Sealed this

Twenty-second Day of August, 2006

JON W. DUDAS
*Director of the United States Patent and Trademark Office*